(12) United States Patent
Doany et al.

(10) Patent No.: US 9,057,844 B2
(45) Date of Patent: Jun. 16, 2015

(54) GRATING EDGE COUPLER AND METHOD OF FORMING SAME

(71) Applicant: International Business Machines Corporation, Armonk, NY (US)

(72) Inventors: Fuad E. Doany, Katonah, NY (US); Frank R. Libsch, White Plains, NY (US); Jeonghwan Song, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/022,907

(22) Filed: Sep. 10, 2013

(65) Prior Publication Data

US 2014/0304971 A1    Oct. 16, 2014

Related U.S. Application Data

(63) Continuation of application No. 13/861,107, filed on Apr. 11, 2013.

(51) Int. Cl.
    *G02B 6/34*    (2006.01)

(52) U.S. Cl.
    CPC .............. *G02B 6/34* (2013.01); *Y10T 29/49885* (2013.01)

(58) Field of Classification Search
    CPC .................................. G02B 6/34; G02B 6/00
    USPC ..................................................... 385/37, 16
    See application file for complete search history.

(56) References Cited

U.S. PATENT DOCUMENTS

| | | | | |
|---|---|---|---|---|
| 3,883,221 | A * | 5/1975 | Rigrod | 385/36 |
| 5,276,745 | A * | 1/1994 | Revelli, Jr. | 385/14 |
| 5,282,080 | A * | 1/1994 | Scifres et al. | 359/344 |
| 5,832,156 | A * | 11/1998 | Strasser et al. | 385/48 |
| 5,850,302 | A * | 12/1998 | Strasser et al. | 398/93 |
| 6,002,822 | A * | 12/1999 | Strasser et al. | 385/48 |
| 6,282,345 | B1 | 8/2001 | Schimpe | |
| 6,343,171 | B1 * | 1/2002 | Yoshimura et al. | 385/50 |
| 6,611,635 | B1 * | 8/2003 | Yoshimura et al. | 385/14 |
| 6,661,942 | B1 * | 12/2003 | Gharavi | 385/16 |
| 6,690,845 | B1 * | 2/2004 | Yoshimura et al. | 385/14 |
| 6,785,447 | B2 | 8/2004 | Yoshimura et al. | |
| 6,845,184 | B1 * | 1/2005 | Yoshimura et al. | 385/14 |
| 6,944,377 | B2 | 9/2005 | Umebayshi et al. | |
| 6,987,906 | B2 | 1/2006 | Nakama et al. | |
| 7,162,124 | B1 * | 1/2007 | Gunn et al. | 385/37 |
| 7,184,627 | B1 * | 2/2007 | Gunn et al. | 385/37 |
| 7,215,854 | B2 | 5/2007 | Telkamp et al. | |
| 7,283,705 | B2 * | 10/2007 | Paek et al. | 385/37 |
| 7,298,941 | B2 | 11/2007 | Palen et al. | |
| 7,656,922 | B2 | 2/2010 | Behfar et al. | |
| 7,881,574 | B2 * | 2/2011 | Pyo et al. | 385/44 |

(Continued)

FOREIGN PATENT DOCUMENTS

| | | |
|---|---|---|
| JP | 61148405 A | 7/1986 |
| JP | 10082925 A | 3/1998 |
| JP | 2001116945 A | 4/2001 |

*Primary Examiner* — Kaveh Kianni
(74) *Attorney, Agent, or Firm* — Ryan, Mason & Lewis, LLP

(57) ABSTRACT

An apparatus for optical coupling comprises a substrate, a first waveguide formed on the substrate and includes a grating structure directing light in a first direction, and a second waveguide formed on the first waveguide and including an angled portion directing the light in a second direction different from the first direction.

7 Claims, 7 Drawing Sheets

(56) References Cited

U.S. PATENT DOCUMENTS

| | | | |
|---|---|---|---|
| 8,064,745 B2* | 11/2011 | Fortusini et al. | 385/37 |
| 2002/0028045 A1* | 3/2002 | Yoshimura et al. | 385/50 |
| 2002/0039464 A1* | 4/2002 | Yoshimura et al. | 385/14 |
| 2002/0076149 A1* | 6/2002 | Deacon | 385/27 |
| 2002/0097962 A1* | 7/2002 | Yoshimura et al. | 385/50 |
| 2007/0258691 A1* | 11/2007 | Charters et al. | 385/132 |
| 2008/0138013 A1* | 6/2008 | Parriaux | 385/37 |
| 2011/0133063 A1* | 6/2011 | Ji et al. | 250/227.24 |
| 2011/0142395 A1* | 6/2011 | Fortusini et al. | 385/37 |
| 2013/0022316 A1* | 1/2013 | Pelletier et al. | 385/37 |
| 2013/0209026 A1* | 8/2013 | Doany et al. | 385/14 |
| 2014/0193115 A1* | 7/2014 | Popovic | 385/14 |
| 2014/0205234 A1* | 7/2014 | Rong et al. | 385/28 |

* cited by examiner

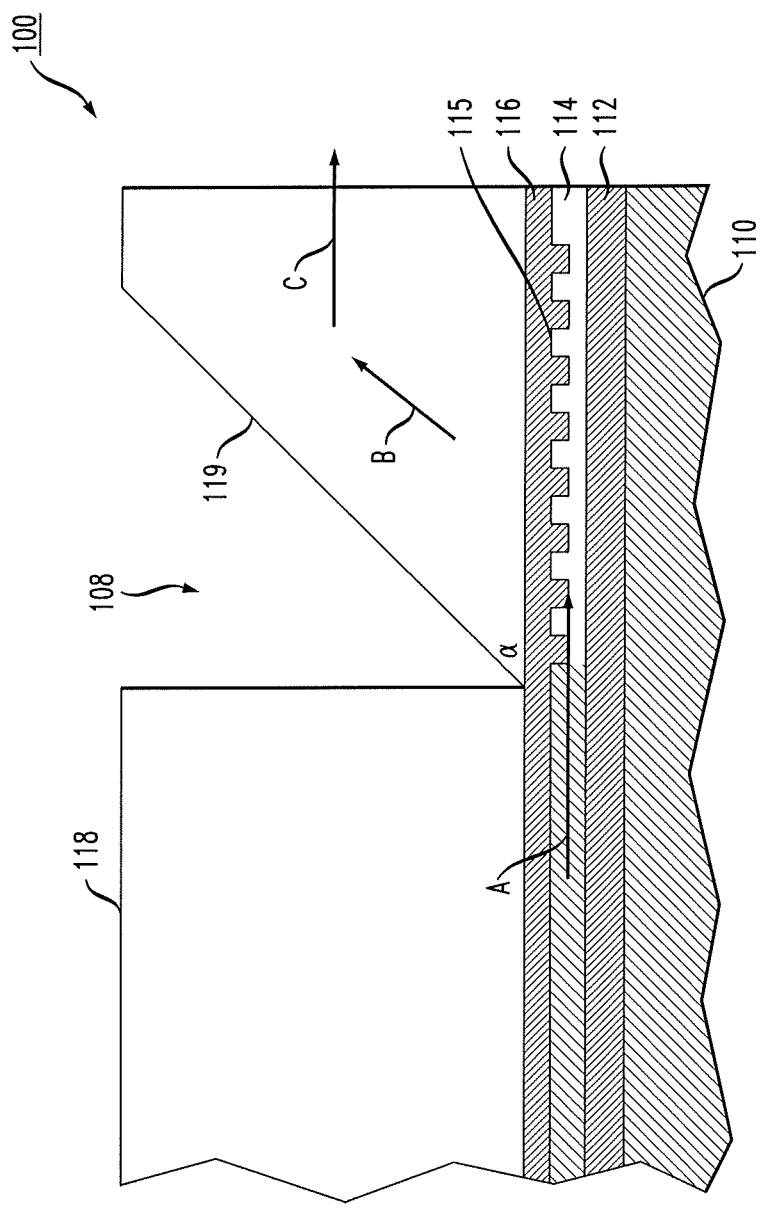
FIG. 1(α)

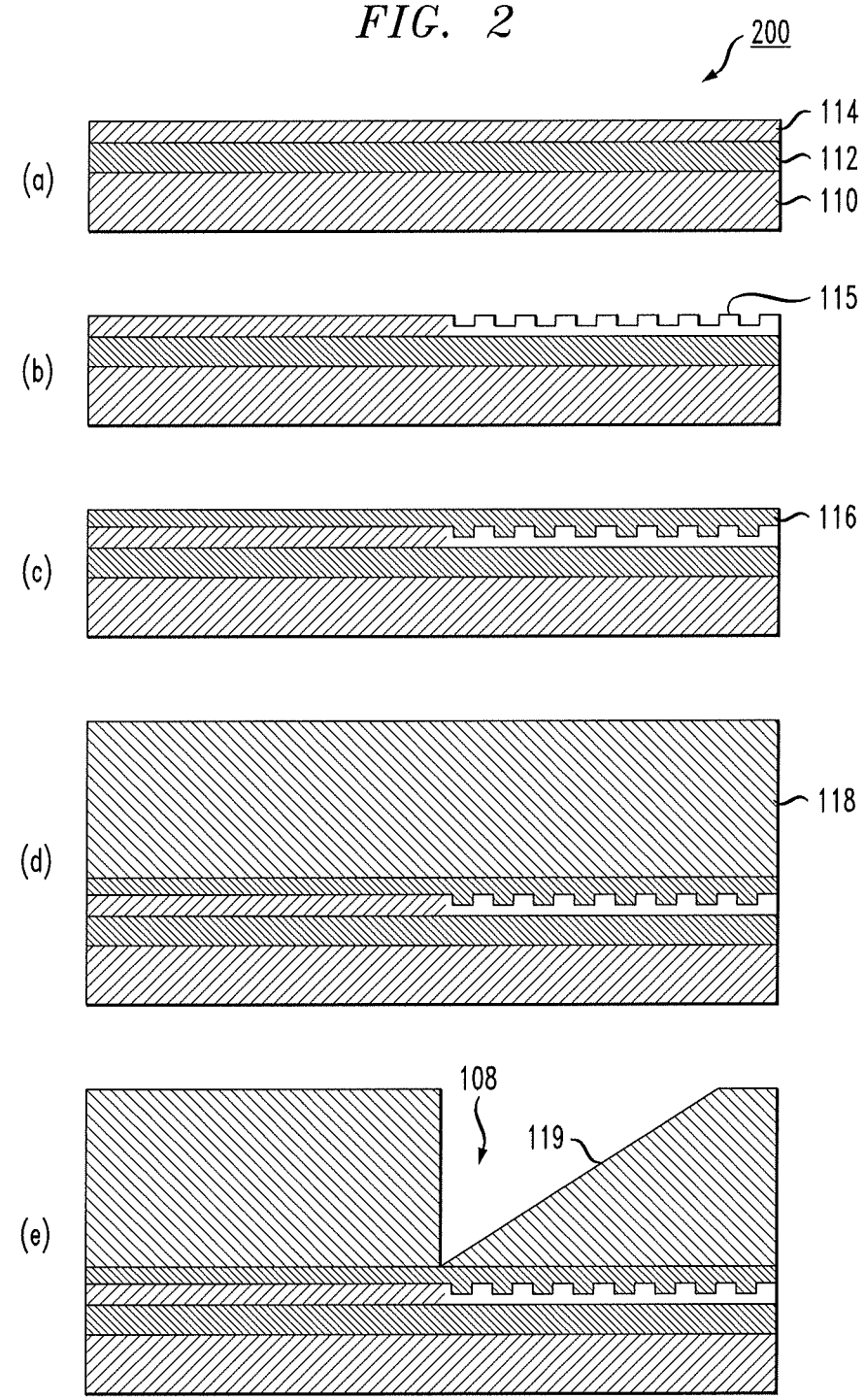

GRATING EDGE COUPLER AND METHOD OF FORMING SAME

CROSS-REFERENCE TO RELATED APPLICATION

This application is a Continuation of U.S. application Ser. No. 13/861,107, filed on Apr. 11, 2013, the disclosure of which is incorporated herein in its entirety by reference.

TECHNICAL FIELD

The field generally relates to a grating coupler and, in particular, to a grating edge coupler and method for forming same.

BACKGROUND

Grating couplers, which have large alignment tolerance and are capable of accommodating large bandwidth, are useful for interconnecting single mode fibers. However, due to the usage of conventional fiber block for the packaging of a device, grating couplers do not free the top surface of a device for electrical and thermal connections and active device integrations. As a result, in order to free up top surfaces for electrical and thermal connectivity, edge coupling has been proposed.

Accordingly, there is a need for a grating coupler which can be used in an edge coupling configuration and free up top surfaces of devices for integration.

SUMMARY

In general, exemplary embodiments of the invention include a grating coupler and, in particular, a grating edge coupler and method for forming same.

According to an exemplary embodiment of the present invention, an apparatus for optical coupling comprises a substrate, a first waveguide formed on the substrate and including a grating structure directing light in a first direction, and a second waveguide formed on the first waveguide and including an angled portion directing the light in a second direction different from the first direction.

According to an exemplary embodiment of the present invention, a method for forming an optical coupling device comprises forming a first waveguide on a substrate, forming a grating structure in the first waveguide for directing light in a first direction, forming a second waveguide on the first waveguide, and forming an angled portion in the second waveguide for directing the light in a second direction different from the first direction.

According to an exemplary embodiment of the present invention, an optically coupled device comprises a coupler comprising a substrate, a first waveguide formed on the substrate and including a grating structure directing light in a first direction, and a second waveguide formed on the first waveguide and including an angled portion directing the light in a second direction different from the first direction, and an element optically coupled to the coupler, wherein the element is positioned collinearly with the second waveguide to receive the light directed in the second direction.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 1(a) is a cross-sectional view illustrating a grating coupler according to an exemplary embodiment of the invention.

FIGS. 2(a)-(e) are cross-sectional views illustrating a method of forming a grating coupler according to an exemplary embodiment of the invention.

DETAILED DESCRIPTION OF EXEMPLARY EMBODIMENTS

Exemplary embodiments of the invention will now be discussed in further detail with regard to a grating coupler and, in particular, a grating edge coupler and methods for forming same. This invention may, however, be embodied in many different forms and should not be construed as limited to the embodiments set forth herein.

The embodiments of the present invention describe an apparatus for optical coupling from one or more integrated first waveguides, fabricated on a plane of a substrate, to one or more fibers arranged in the plane. A grating structure in the plane of the first waveguide is used to direct light to an angle which is oblique and/or near normal to the substrate to a turning element integrated into a second waveguide on an upper surface of the first waveguide. The turning element directs light into the second waveguide in a direction parallel to or substantially parallel to the plane of the substrate. The output of the second waveguide is then received by coupled fibers arranged collinearly with the second waveguide.

Embodiments of the present invention provide an apparatus which permits optical coupling between two waveguides at different levels, where the apparatus contains at least one angled mirror waveguide structure positioned on a waveguide with a grating coupler. The edge coupling approach according to embodiments of the present invention provides less light loss and better alignment, and improves optical coupling efficiency over prior configurations.

It is to be understood that the various layers and/or regions shown in the accompanying drawings are not drawn to scale, and that one or more layers and/or regions of a type commonly used in optical coupling devices may not be explicitly shown in a given drawing. This does not imply that the layers and/or regions not explicitly shown are omitted from the actual optical coupling devices. Moreover, the same or similar reference numbers used throughout the drawings are used to denote the same or similar features, elements, or structures, and thus, a detailed explanation of the same or similar features, elements, or structures will not be repeated for each of the drawings.

The apparatus for optical coupling in accordance with the embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell phones), solid-state media storage devices, functional circuitry, etc. Systems and hardware incorporating devices for optical coupling are contemplated embodiments of the invention. Given the teachings of the embodiments of the invention provided herein, one of ordinary skill in the art will be able to contemplate other implementations and applications of embodiments of the invention.

Figure 1B:
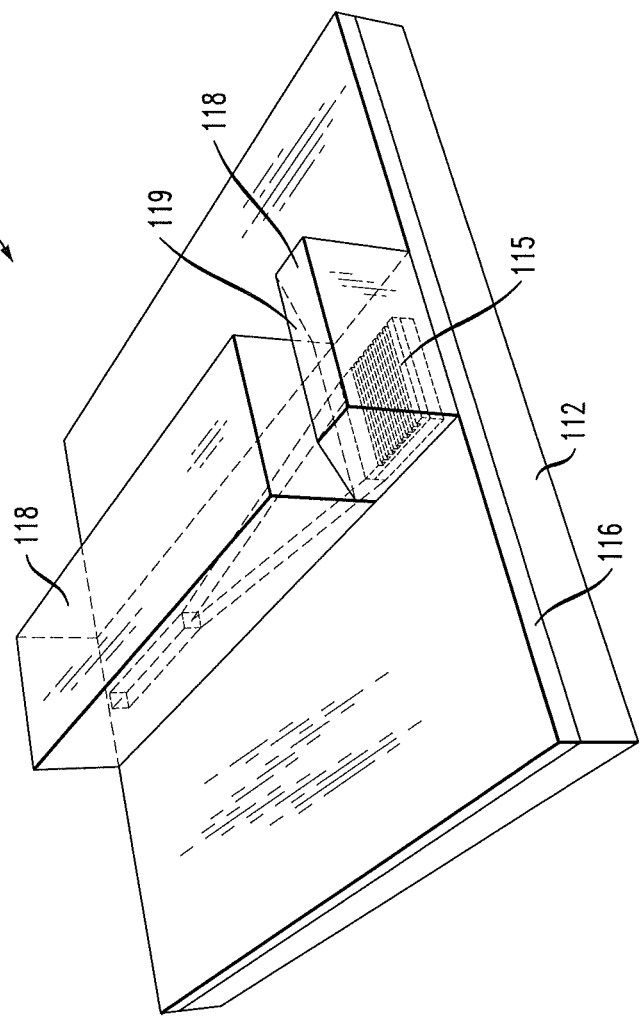
FIG. 1(b) is a top perspective view of a grating coupler according to an exemplary embodiment of the present invention.

Referring, for example, to FIGS. 1(a) and 1(b), in accordance with an embodiment of the present invention, a grating edge coupler 100 comprises a semiconductor substrate 110 including, for example, silicon. A buried oxide (BOX) layer 112 is formed on the substrate 110. A first waveguide 114, including for example, silicon (Si), polysilicon (poly-Si), a silicon nitride (SiNx), a silicon oxide (SiOx), oxynitride and/or a polymer is formed on the BOX layer 112. The first waveguide includes a grating structure 115, including a plurality of recessed and raised portions. The grating structure is formed on a portion of the first waveguide 114, and, as shown by arrows A and B, is used to direct light to an angle which is oblique and/or near normal to the substrate 110. The grating structure is not necessarily limited to the configuration shown, and may include alternative configurations capable of directing light in the described manner. According to embodiments, the grating can be a uniform or an apodized structure.

The grating edge coupler further includes an overcladding layer 116 formed on the first waveguide 114 including the grating structure 115. The overcladding comprises, for example, an oxide. A second waveguide layer 118, comprising, for example, Si, poly-Si, SiNx, SiOx, oxynitride, a polymer and/or a spin on dielectric, such as, for example, benzocyclobutene (BCB) or some other optically transparent material, is formed on the overcladding layer 116. According to an embodiment, the second waveguide layer is formed to a thickness of about 10 μm to about 20 μm. In another embodiment, the thickness may be greater than 20 μm.

The second waveguide layer 118 includes an angled cutout portion 108, including a surface making an oblique angle α with the substrate 110. The angle α is approximately 40 degrees to approximately 45 degrees, and is preferably in a range of about 41 degrees to 42 degrees. The surface includes a mirror 119 formed on the surface. According to an embodiment, the mirror performs total or about total internal reflection. The mirror can include, for example, a reflective material, such as, for example, a metal coating (e.g., gold), or a dielectric mirror coating, but is not limited thereto. The mirror 119 is integrated into the second waveguide 118 on an upper surface of the first waveguide 114, and referring to arrow C in FIG. 1, directs light into the second waveguide 118 in a direction parallel to or substantially parallel to the horizontal plane of the substrate 110. The output of the second waveguide 118 is then received by coupled fibers arranged collinearly with the second waveguide 118. With respect to FIG. 1(b), for illustrative purposes, it is to be understood that portions of the structure as shown have been removed and/or depicted as transparent for ease of understanding.

FIGS. 2(a)-2(e) are cross-sectional views illustrating a method of forming a grating coupler according to an exemplary embodiment of the invention. Referring to FIG. 2(a), the first waveguide layer 114 is formed on the substrate 110 including the BOX layer 112. As per FIG. 2(b), the grating structure 115 is formed in a portion of the first waveguide layer, using, for example, deep ultra-violet (UV) photolithography or electron beam patterning performed on the first waveguide layer 114. Then, referring to FIG. 2(c), deposition of the overcladding layer 116 on the first waveguide 114 is performed.

Referring to FIG. 2(d), the second waveguide layer 118 is deposited to a thickness of about 10 μm to about 20 μm, using, for example, plasma enhanced chemical vapor deposition (PECVD), flame hydrolysis deposition (FHD), or double stack deposition. The second waveguide layer 118 may be, for example, a low stress spin on dielectric, such as BCB or another optically transparent dielectric material, including, for example, a polymer. According to an embodiment, the first and second waveguides 114 and 118 are formed to have different cross-sectional dimensions.

Referring to FIG. 2(e), the angled cutout portion 108, including a surface making an oblique angle α with the substrate 110 and mirror 119 are formed in the second waveguide 118 by, for example a gray scale side wall etch using, for example, a gray scale mask, and/or a dicing blade. According to an embodiment, an about 41 degree to about 42 degree fine grit size dicing blade can be used. Depending on the angle α, the angle of the dicing blade can be varied. According to embodiments of the present invention, a gray level photolithography mask process, embossing and/or laser ablation can be used in addition to, or in lieu of etching to form the mirror 119 and angled cutout portion 108 of the second waveguide 118. A coating process, such as, for example, plating, can be used to coat a metal (e.g., gold), or a dielectric mirror coating on the angled surface.

Figure 3:
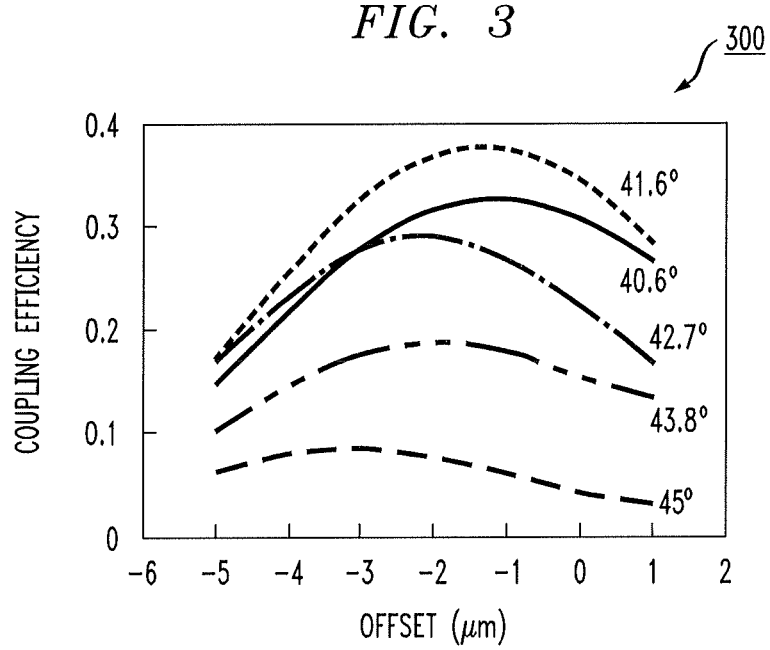
FIG. 3 is a graph showing coupling efficiency versus offset in connection with different mirror angles according to exemplary embodiments of the invention.

With respect to the angle α, FIG. 3 is a graph showing coupling efficiency versus offset in connection with different mirror angles according to exemplary embodiments of the invention. Offset refers to the location of the mirror with respect to the center of the grating structure, and coupling efficiency refers to how efficiently light is transmitted to the coupled object. In the graph in FIG. 3, a uniform grating structure, a 220 nm silicon-on-insulator (SOI), a 70 nm grating height, and a 610 nm grating period for a 1550 nm wavelength are used. As can be seen from FIG. 3, given these constraints, and values for α of 40.6, 41.6, 42.7, 43.8 and 45 degrees, an angle α of 41.6 degrees provides the best coupling efficiency at each offset, and an angle of 45 degrees provides the worst coupling efficiency at each offset.

Figure 4A:
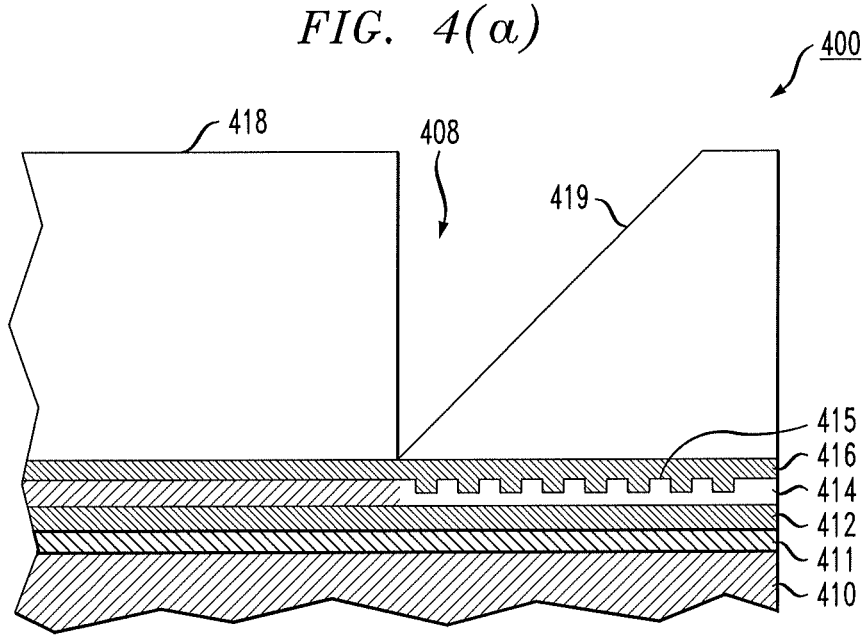
FIG. 4(a) is a cross sectional view illustrating a grating coupler including a bottom reflector according to an exemplary embodiment of the invention.

FIG. 4(a) is a cross sectional view illustrating a grating coupler including a bottom reflector according to an exemplary embodiment of the invention. The embodiment described in connection with FIG. 4(a) is similar to the embodiment described in connection with FIG. 1, except for the addition of the bottom reflector. Like or similar elements have been designated with similar reference numbers.

The grating coupler 400 of FIG. 4(a) includes a bottom reflector 411 located between a substrate 410 and the BOX layer 412. In accordance with embodiments of the present invention, the bottom reflector 411 can comprise a metal material, such as, for example, gold, aluminum, or copper, or a dielectric material, such as, for example a Bragg reflector.

Figure 4B:
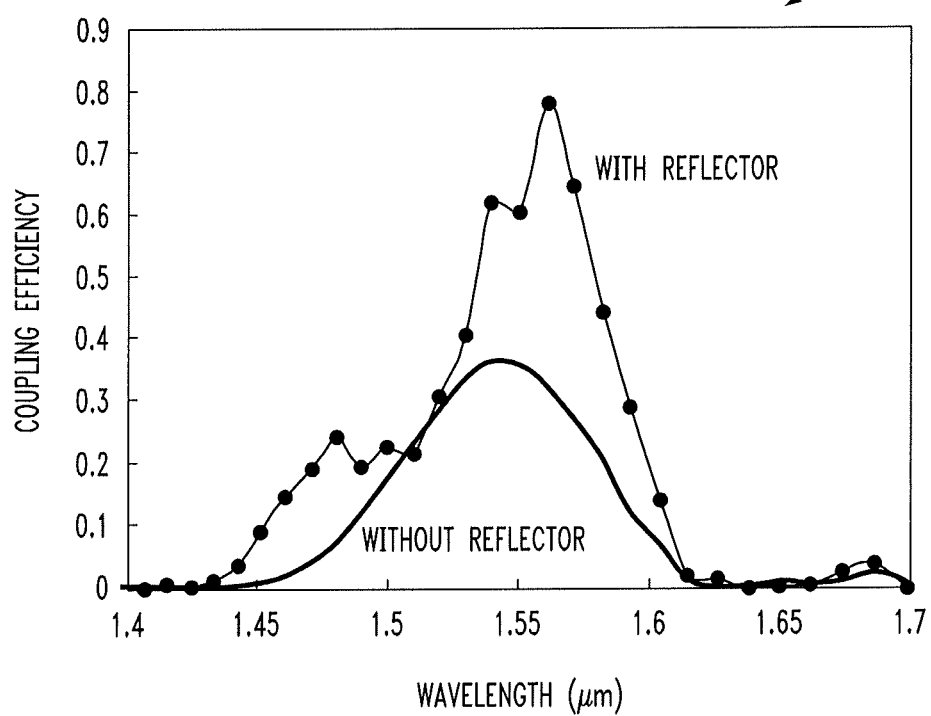
FIG. 4(b) is a graph illustrating a coupling efficiency versus wavelength for grating couplers with and without bottom reflectors, according to exemplary embodiments of the present invention.

FIG. 4(b) is a graph illustrating a coupling efficiency versus wavelength for grating couplers with and without bottom reflectors, according to exemplary embodiments of the present invention. In connection with an optimized uniform grating edge coupler using a 220 nm SOI and having a mirror angle of 41.6 degrees, the coupling efficiency is generally improved for certain wavelengths (e.g., about 1.45 to about 1.6 μm) when a bottom reflector is used.

Figure 5:
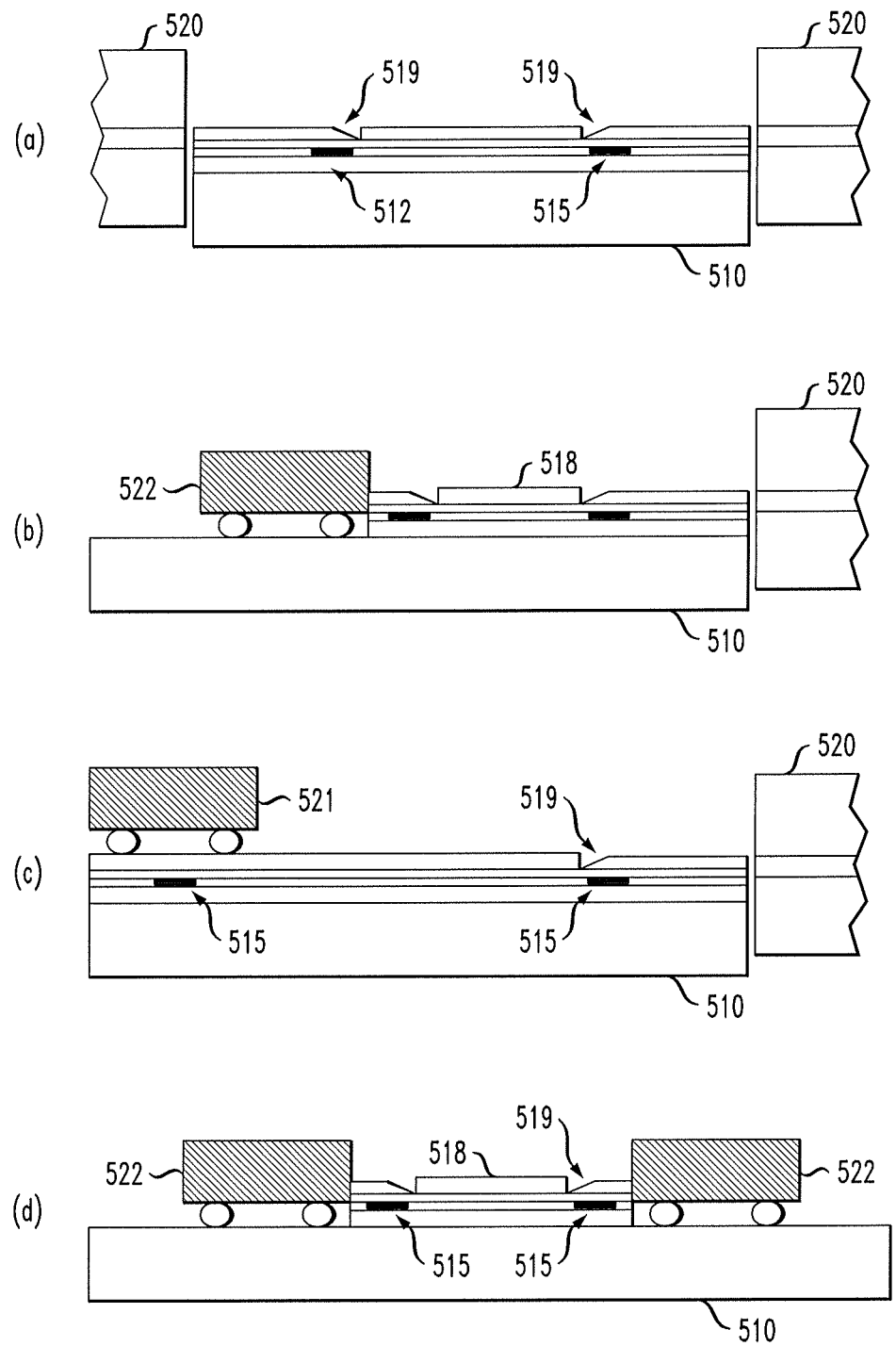
FIGS. 5(a)-(d) are cross-sectional views illustrating coupling applications of a grating coupler according to exemplary embodiments of the present invention.

FIGS. 5(a)-(d) are cross-sectional views illustrating coupling applications of a grating coupler according to exemplary embodiments of the present invention. As can be seen in FIGS. 5(a)-(d), a grating coupler includes substrate 510, BOX layer 512, first waveguide 514 including grating structure 515, overcladding 516, second waveguide 518 including mirror 519 and cutout portion 508. Depending on the items being optically coupled, the size, location and/or number of certain elements can vary. For example, the grating coupler in FIG. 5(a), which couples optical fiber 520 to optical fiber 520, includes two mirrors 519 and two grating structures 515. The angled portions in FIG. 5(a) are sloped in opposite directions from each other.

In FIG. 5(b), an edge emitting optoelectronic (OE) module 522 or laser or photodiode is coupled to a fiber 520. Like the grating coupler in FIG. 5(a), the grating coupler in FIG. 5(b) includes two mirrors 519, two grating structures 515, and angled portions which are sloped in opposite directions from each other. In FIG. 5(b), the substrate 510 is, for example, a silicon platform for integration including the OE module 522 thereon. In addition, the angled portion adjacent the OE module 522 is closer to the OE module than a distance between the angled portion adjacent the fiber 520 and the fiber 520.

In FIG. 5(c), a surface emitting optoelectronic (OE) module 521 or laser or photodiode is coupled to an optical fiber 520. In this embodiment, the grating coupler includes an angled portion and mirror adjacent the fiber 520 which are similar to the angled portions and mirrors adjacent the right-side fibers 520 in FIGS. 5(a) and 5(b). In addition, unlike FIGS. 5(a) and 5(b), an OE module 521 is positioned on the second waveguide 518, and a grating structure 515 in the first waveguide 514 is positioned under the OE module 521.

In FIG. 5(d), edge emitting OE modules 522 or laser or photodiodes are coupled to each other, and each OE module 522 is positioned on the substrate 510, which is an Si-platform for integration. In this embodiment, the grating coupler includes two mirrors 519, two grating structures 515, and angled portions which are sloped in opposite directions from each other. The embodiments in FIGS. 5(b)-5(d) illustrate flip chip bonding. It is to be understood that the embodiments of the invention are not necessarily limited to what is shown in FIGS. 5(a)-5(d), and can vary based, for example, on different design considerations. In accordance with an embodiment of the present invention, the fiber 520 does not contain an angle cleaving facet. In addition, in an embodiment, the grating structure 515 is located below at least a portion of or all of the fiber 520 coupled to the second waveguide 518.

Figure 6:
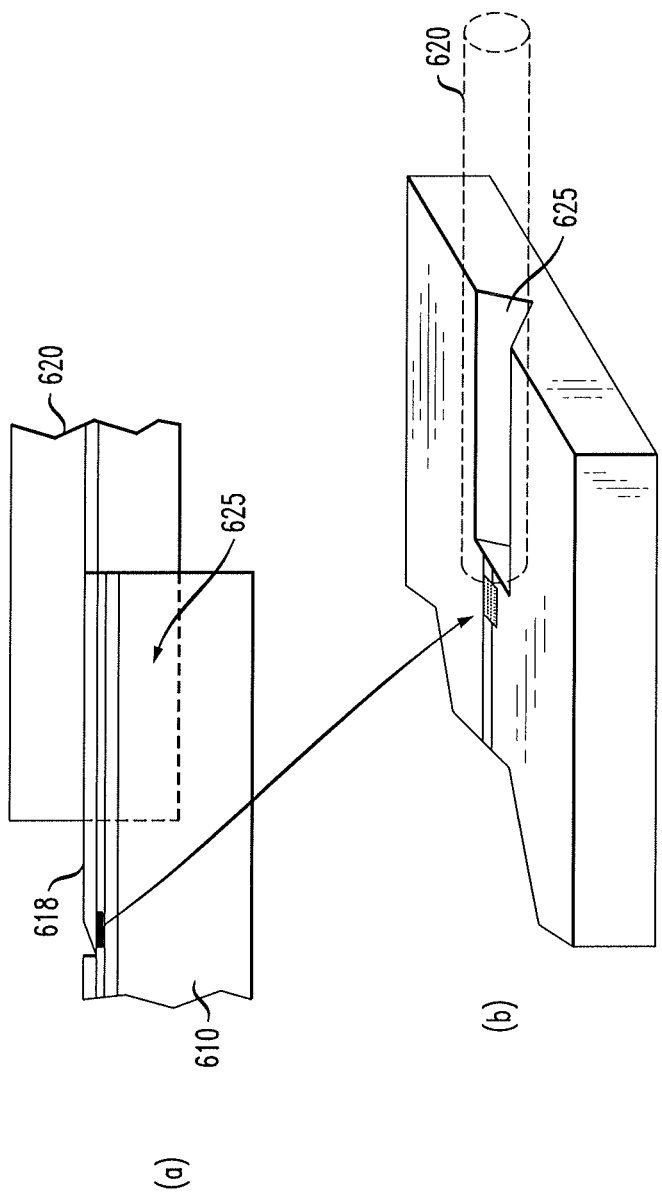
FIGS. 6(a)-(b) are cross-sectional and perspective views, respectively, illustrating a V-groove integrated platform for a grating coupler according to an exemplary embodiment of the present invention.

FIGS. 6(a)-(b) are cross-sectional and perspective views, respectively, illustrating a V-groove integrated platform for a grating coupler according to an exemplary embodiment of the present invention, wherein fiber alignment to the second waveguide is accomplished via the V-groove. According to an embodiment, the grating coupler including, for example, the substrate, BOX, first waveguide, overcladding and second waveguide in a layered structure, includes a V-groove 625 formed through at least a portion of the structure. In accordance with an embodiment of the present invention, the V-groove 625 penetrates to the substrate 610. However, in accordance with the embodiments of the present invention, the depth of the V-groove 625 can vary, and can, for example, penetrate into the substrate 610, stop at the substrate 610 without penetrating the substrate 610, or stop at a layer above the substrate 610. Referring to FIG. 6(b), the fiber 620 fits into the V-groove 625 for passive fiber alignment. According to an embodiment, the shape and configuration of the cut-out portion (in this case a V-groove 625), can vary according to design considerations, and may not necessarily be a V-groove.

Referring to FIGS. 5(a)-(c) and 6(a)-(b), the center or about the center of the fiber 520, 620 (e.g., the fiber core) is positioned collinearly with the second waveguide 518, 618. In addition, as noted previously, the second waveguide has a thickness in a range of, for example, 10 μm to about 20 μm, to correspond to a size of the fiber core.

According to an embodiment, the collinear arrangement can be facilitated by the V-groove for passive fiber alignment. Further, referring to FIGS. 5(b) and 5(d), similar to the fibers 520, 620, OE modules 522 are positioned collinearly with the second waveguide 518 to receive light directed by the angled portion in a plane parallel or substantially parallel to the horizontal plane of the substrate 510.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for forming an optical coupling device, the method comprising:
    forming a first waveguide on a substrate;
    forming a grating structure in the first waveguide for directing light in a first direction;
    forming a second waveguide on the first waveguide;
    forming a cutout in the second waveguide, wherein the cutout is located between an angled surface of the second waveguide for directing the light in a second direction different from the first direction and another surface of the second waveguide;
    forming a groove in at least the first and second waveguides; and
    inserting a coupled fiber into the groove;
    wherein forming the cutout in the second waveguide comprises removing a part of the second waveguide so that the cutout comprises a vacant area located between a first portion of the second waveguide including the another surface as a side of the first portion, and a second portion of the second waveguide including the angled surface as a side of the second portion.

2. The method of claim 1, wherein the first direction is normal to or forms an oblique angle with the substrate, and the second direction is parallel to or substantially parallel to a horizontal plane of the substrate.

3. The method of claim 1, wherein forming the second waveguide is performed by at least one of plasma enhanced chemical vapor deposition and flame hydrolysis deposition.

4. The method of claim 1, wherein the second waveguide is formed to a thickness of about 10 μm to about 20 μm.

5. The method of claim 1, wherein the second waveguide includes a spin on dielectric.

6. The method of claim 1, wherein the removing is performed at least one of by a dicing blade and by etching.

7. The method of claim 1, further comprising forming a mirror on the angled surface.

* * * * *